United States Patent [19]
Kagawa

[11] Patent Number: 6,160,637
[45] Date of Patent: Dec. 12, 2000

[54] FACSIMILE APPARATUS AND METHOD

[75] Inventor: Tetsuya Kagawa, Ebina, Japan

[73] Assignee: Ricoh Company, Ltd., Tokyo, Japan

[21] Appl. No.: 09/048,779

[22] Filed: Mar. 26, 1998

[30] Foreign Application Priority Data

Mar. 28, 1997 [JP] Japan ..................................... 9-077211

[51] Int. Cl.$^7$ .................................................... H04N 1/00
[52] U.S. Cl. ...................... 358/434; 358/412; 379/100.01
[58] Field of Search .................................... 358/434, 405,
358/406, 412, 468, 436–438; 379/100.15,
100.01; 370/465, 468; 714/746; 455/553,
557

[56] References Cited

U.S. PATENT DOCUMENTS

| | | | |
|---|---|---|---|
| 5,001,571 | 3/1991 | Murano .................................... | 358/434 |
| 5,057,938 | 10/1991 | Edamura .................................. | 358/406 |
| 5,303,066 | 4/1994 | Kawaguchi .............................. | 358/434 |
| 5,353,125 | 10/1994 | Nakagawa et al. ..................... | 358/439 |
| 5,406,388 | 4/1995 | Matsuzaki ................................ | 358/434 |
| 5,477,340 | 12/1995 | Hasegawa ................................ | 358/438 |

OTHER PUBLICATIONS

"Procedures For Starting Sessions Of Data Transmission Over The General Switched Telephone Network", ITU–T Recommendation V.8, International Telecommunication Union, Sep. 1994, p. 1–10.

"A modem operating at data signalling rates of up to 33 600 bit/s for use on the general switced telephone network and on leased point–to–point 2–wire telephone–type circuits", ITU–T Recommendation V.34, International Telecommunication Union, Oct. 1996, p. 1–67.

"Procedures For Starting Sessions Of Data Transmission Over The Public Switched Telephone Network", Draft ITU–T Recommendation V.8, International Telecommunication Union, Sep. 12, 1997, p. 3–10.

*Primary Examiner*—Kimberly A. Williams
*Attorney, Agent, or Firm*—Cooper & Dunham LLP

[57] ABSTRACT

A data communication apparatus having a low transmission mode and a high transmission mode. The apparatus includes a switch selector switching the transmission mode between the high transmission mode and the low transmission mode based on a received switching signal. A mode detector detects whether the switch selector has switched the transmission mode to the low transmission mode. A timer starts to clock a time period after the switch selector has switched the transmission mode from the high transmission mode to the low transmission mode. A rate detector detects a data bit-rate in the high transmission mode. A calculator calculates a waiting period based on the detected bit-rate. A disconnect unit disconnects a telephone line if the clocked time period exceeds the waiting period.

24 Claims, 8 Drawing Sheets

FACSIMILE APPARATUS AND METHOD

BACKGROUND AND SUMMARY OF THE INVENTION FIELD

The disclosed apparatus and method relate to facsimile transmission and reception of data such as by use of a transmission control procedure based on the G3 (Group III) standard of ITU-T ( International Telecommunication Union—Telecommunication standardization sector) such as described in Recommendation V.34 (10/96) which is hereby incorporated by reference in this disclosure, as are Draft ITU-T Recommendation V.8 (Sep. 12, 1997) and ITU-T Recommendation V.8 (09/94). Background information regarding facsimile transmission and reception can be found in commonly assigned U.S. Pat. No. 5,303,066, which also is incorporated by reference in this disclosure.

BACKGROUND

Facsimile machines capable of transmitting and receiving image data by the use of a transmission control procedure based on ITU-T Recommendation V.34, transmit image data over a primary channel at a relatively high speed (high transmission mode) and transmit control data over a relatively slow speed auxiliary or control channel (low transmission mode). When it is necessary to switch from one of these transmission modes to the other after a communication link is established between a transmitting machine or station (TX) and a receiving machine or station (RX), switching data is transmitted from one of the stations to the other, and both stations have to switch transmission mode and coder/decoder type concurrently so that image data can be transmitted following control data transmission or control data can be transmitted following image data transmission. If a transmission error occurs and the receiving station detects an error that prevents it from determining if switching data has been sent to it, the receiving station can switch to the low transmission mode and await the receipt of control data from the transmitting station. However, this can be wasteful because the receiving station cannot receive image data while in the low transmission mode and can go on waiting for control data and the transmitting station can disconnect the communication link. The receiving station may not have information needed to determine if it should continue waiting or take some other action, such as disconnecting its link with the transmitting station.

SUMMARY

Wasteful waiting can be reduced through use of the apparatus and method disclosed herein—by using available information after a transmission error has been detected to calculate how long the receiving station should wait and in what mode. For example, the waiting time can be tied to the transmission rate, or it can be tied to how much of the expected image data was received before the transmission error was detected, or it can be tied to how much more image data was expected at the time the transmission error was detected. In this manner, the receiving station can wait for control data only for a time interval that is meaningful in the context of the transmission during which a transmission error was detected, and wasteful waiting can be reduced to thereby achieve greater efficiency.

An embodiment of the present invention relates to a data communication apparatus having a low transmission mode and a high transmission mode. The apparatus includes a switch selector switching the transmission mode between the high transmission mode and the low transmission mode based on a received switching signal. A mode detector detects whether the switch selector has switched the transmission mode to the low transmission mode. A timer starts to clock a time period after the switch selector has switched the transmission mode from the high transmission mode to the low transmission mode. A rate detector detects a data bit-rate in the high transmission mode. A calculator calculates a waiting period based on the detected bit-rate. A disconnect unit disconnects a telephone line if the clocked time period exceeds the waiting period.

DETAILED DESCRIPTION

Figure 1:
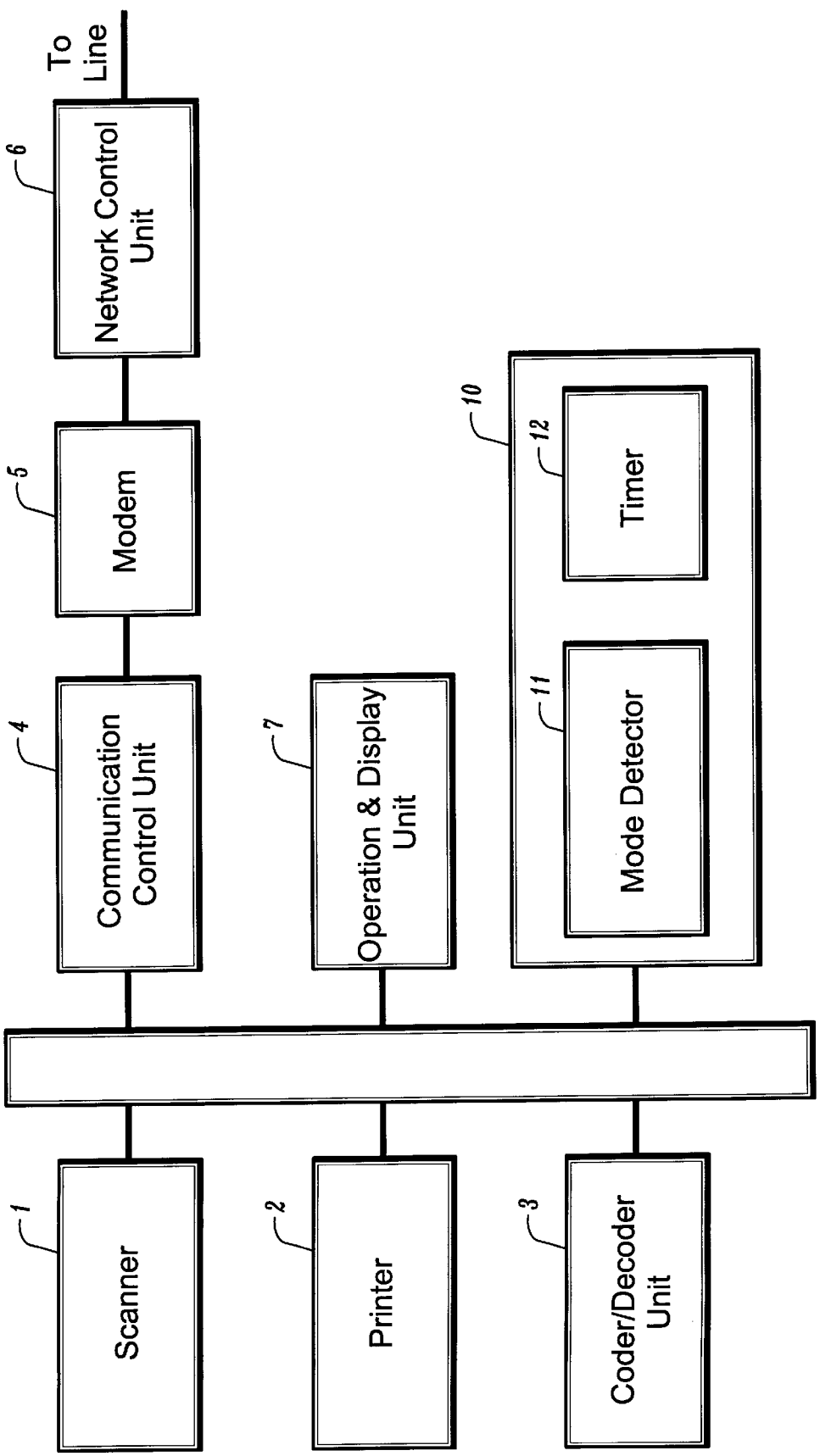
FIG. 1 is a block diagram illustrating a facsimile machine which can serve as a transmitting station or as a receiving station.

FIG. 1 illustrates in block diagram form a facsimile machine which can serve either as a transmitting station or as a receiving station. The facsimile machine comprises a scanner 1, a printer 2, a coder/decoder unit 3, a communication control unit 4, a modem 5, a network control unit 6, an operation and display unit 7, and a system control unit 10. The scanner 1 scans a document to produce image data which can be processed for transmission to a receiving station. The printer 2 prints image data received at a receiving station, or prints other documents such as reports or copies at either the transmitting station or the receiving station. The coder/decoder 3 selectively codes image data provided from the scanner 1, such as by compression, or decodes received image data, such as by expansion or decompression. The communication control unit 4 executes control protocol procedures. The modem 5 selectively modulates or demodulates communication data and conforms to an appropriate standard such as ITU-T Recommendation V.8 or V.34. The network control unit 6 is connected to a telephone line or a comparable communication link in order to control the origination and receipt of a call. The operation and display unit 7 serves as an interface between the facsimile apparatus and an operator. The system control unit 10 controls facsimile operations and includes a mode detector 11 and a timer 12. The mode detector 11 detects a switching of a transmission mode. The timer 12 starts to keep time after a switch to the low transmission mode.

Figure 2:
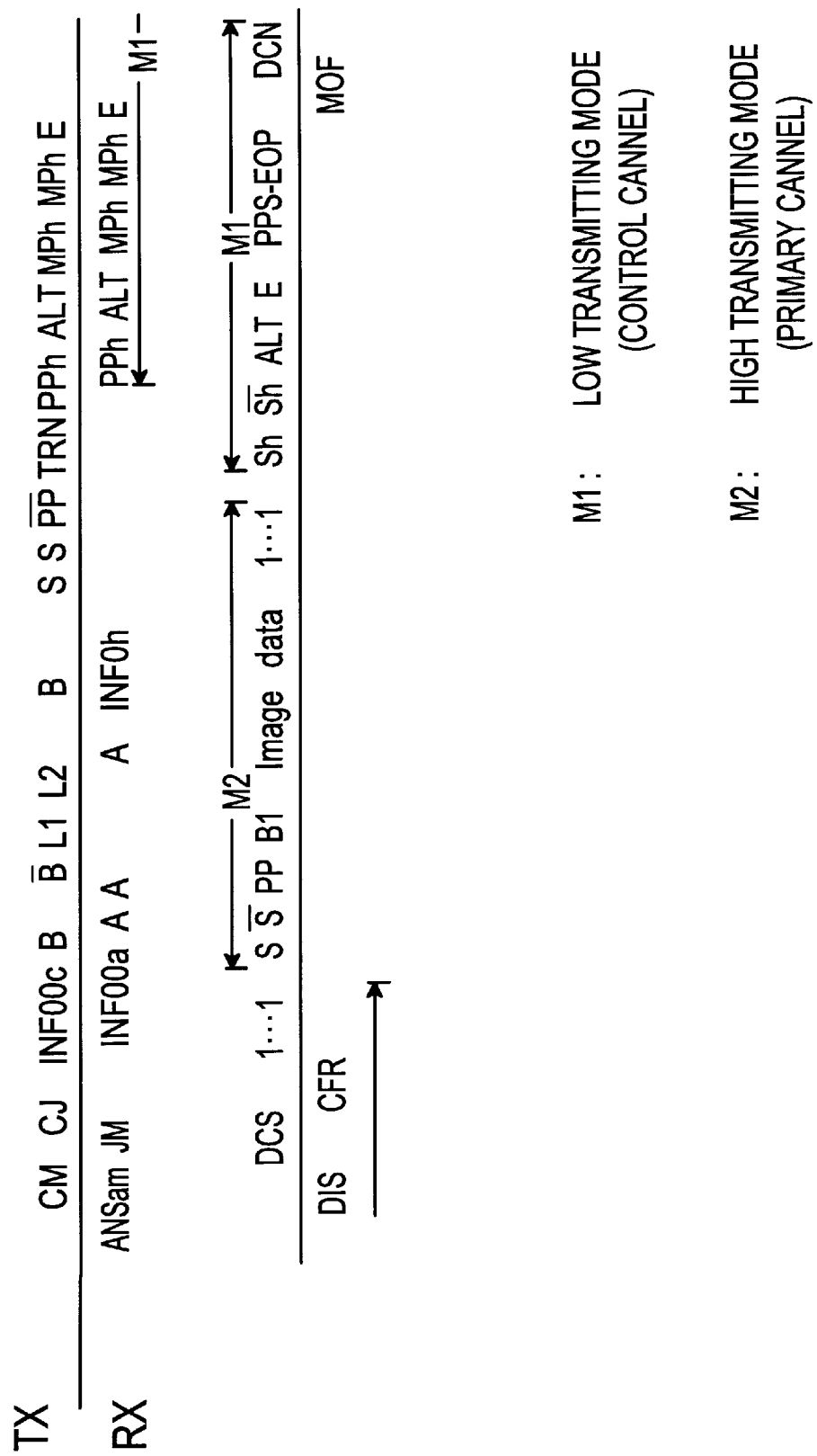
FIG. 2 illustrates a protocol sequence of a Recommendation V.34 communication.

FIG. 2 illustrates a protocol sequence of a Recommendation V.34 communication, where TX designates the transmitting station and the symbols above the horizontal line designate signals generated at the transmitting station and RX designates the receiving station and the symbols below the line designate signals generated at the receiving station. As illustrated, a period M1 of a low transmission mode (control channel) starts with a PPh signal generated at both TX and RX and ends with a CFR signal generated at RX, and another period M1 of a low transmission mode starts with an Sh signal generated at TX and ends with a DCN signal also generated at TX. A period M2 of a high transmission mode (primary channel) starts with a signal S generated at TX and ends with a signal "1 . . . 1" also generated at TX following the transmission of image data from TX to RX. The signal "1 . . . 1" from TX serves as a command to switch transmission mode. When the communication control unit 4 in the transmitting station sends the signal "1 . . . 1" to command switching the transmission mode, and there is no error in transmission and interpretation of that signal at RX, the receiving station responds to the signal "1 . . . 1" by switching the transmission mode and changing the type of modulation and demodulation.

Figure 3:
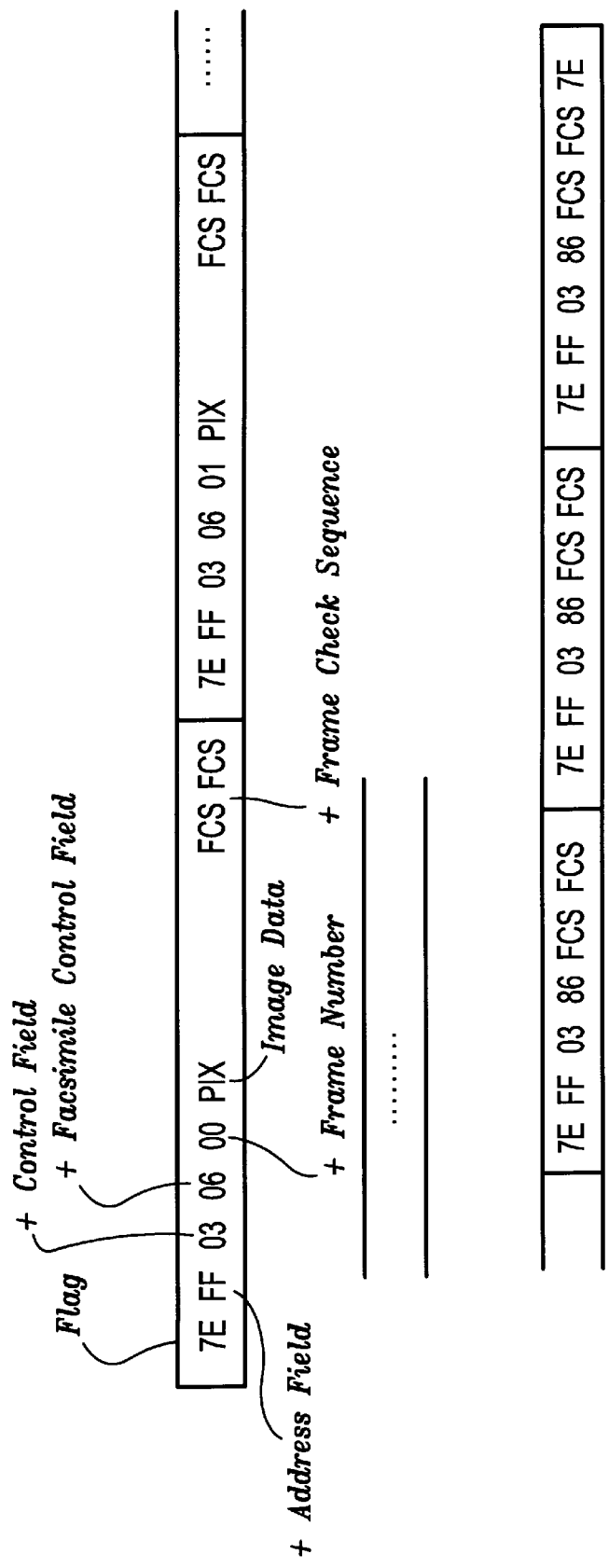
FIG. 3 illustrates an error correction mode (ECM) communication.

FIG. 3 illustrates a frame format in ECM (error correction mode) communication. As shown, the frame format for ECM communication includes the following sequences:

| | |
|---|---|
| Flag | 7E; |
| +Address Field | FF; |
| +Control Field | 03; |
| +Facsimile Control Field | 06; |
| +Frame Number | 00 through FF; |
| Image Data (pix) | (256 bytes or 64 bytes); and |
| +Frame Check Sequence (FCS) | 2 bytes. |

Figure 4:
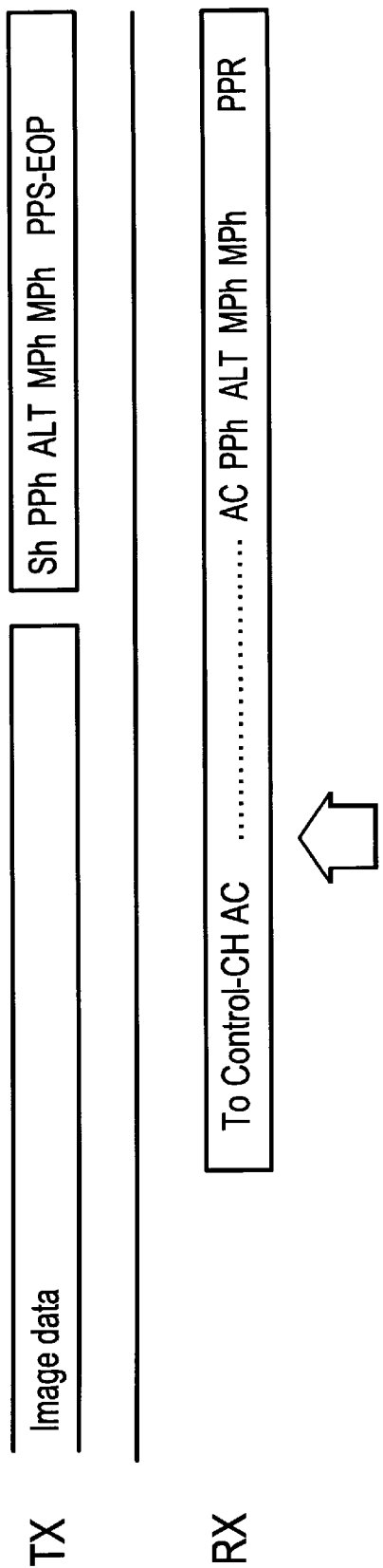
FIG. 4 illustrates a protocol sequence without time-out.

FIG. 4 illustrates a protocol sequence without a time-out, i.e., a sequence in which the receiving station has detected an error and a successful retraining procedure has been carried out so that the transmitting station can start sending data again, without an interruption of the communication link between the transmitting and receiving stations. In this sequence, the receiving station detects an error, switches to the low transmission mode, and sends an AC signal to the transmitting station and starts a re-training procedure. If the re-training procedure is successful, the receiving station sends a PPR signal to the transmitting station to ask for data to be resent.

Figure 5:
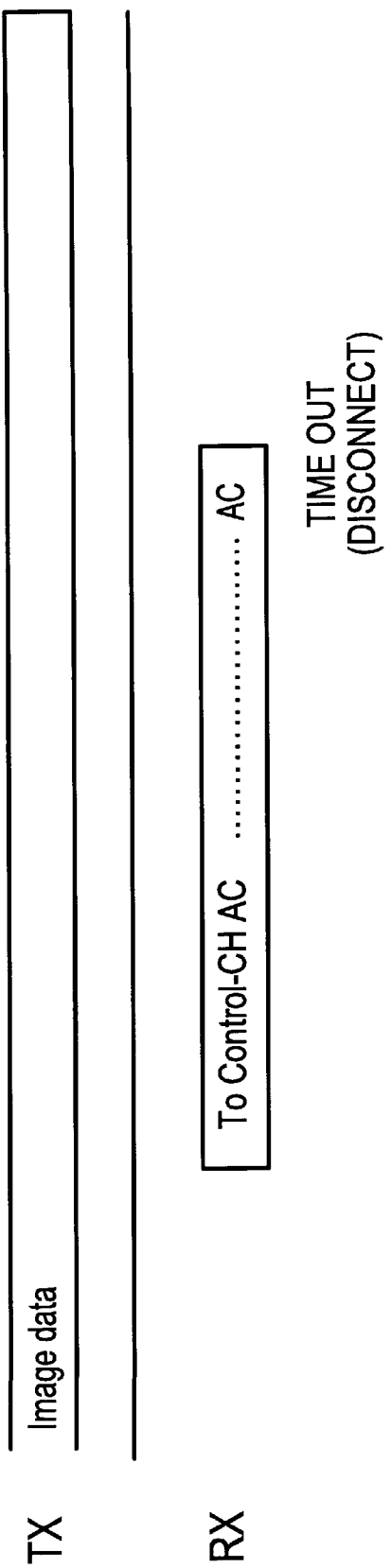
FIG. 5 illustrates a protocol sequence with time-out.

FIG. 5 illustrates a protocol sequence with time-out, i.e., the receiving station has detected an error and has started to send an AC signal but the appropriate procedure for TX and RX has not been carried out within a preset period of time and RX therefore has stopped sending the AC signal and has disconnected from the telephone line.

Figure 6:
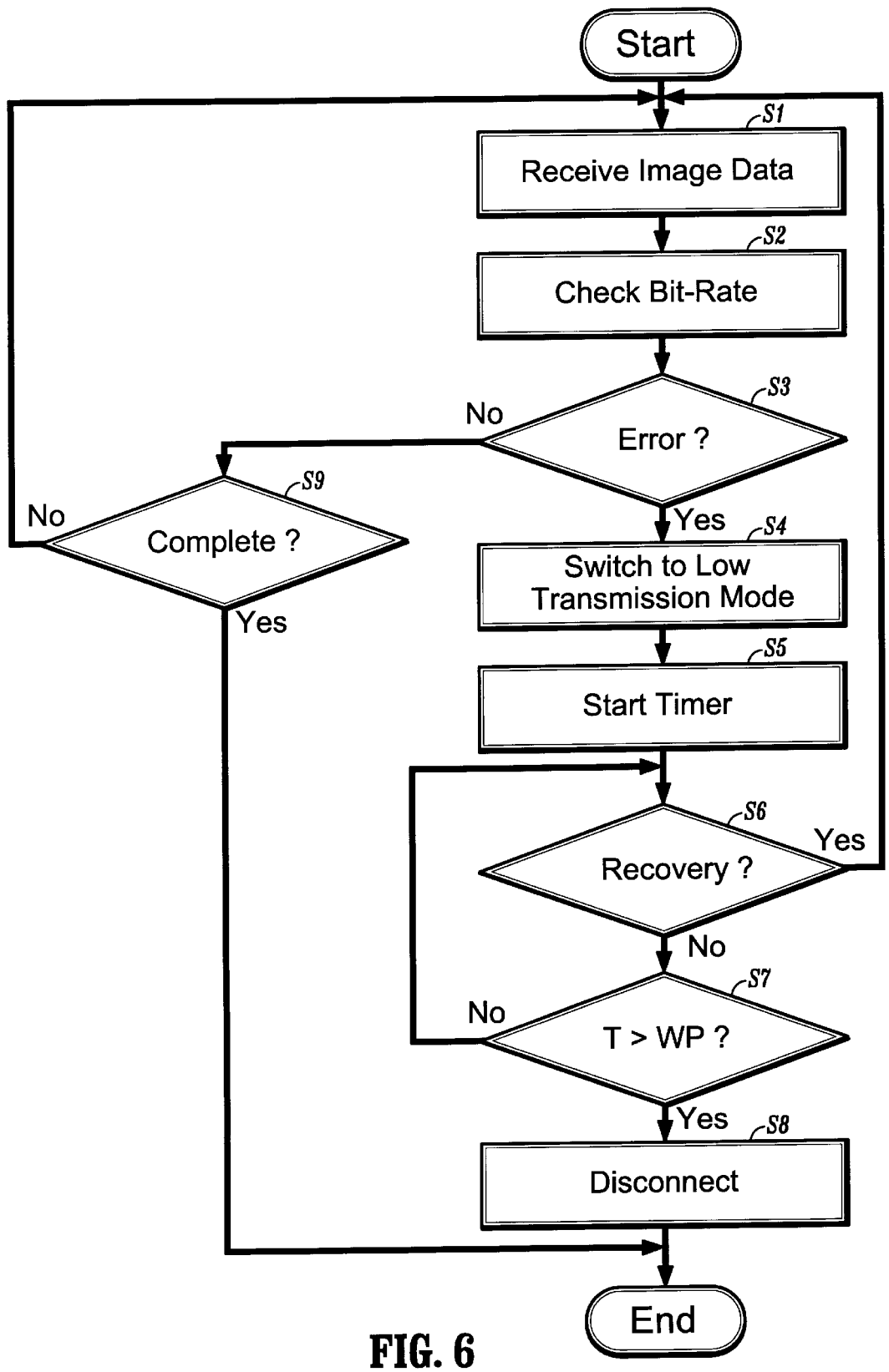
FIG. 6 is a flowchart illustrating a first embodiment.

FIG. 6 is a flowchart illustrating a receiving operation in which the waiting time is calculated based on the bit rate of the transmission. The receiving station starts receiving image data in step S1 and checks a bit-rate in the high transmission mode in step S2. The receiving station then checks in step S3 whether or not a transmission error has occurred in step 3. If no transmission error has occurred, the process checks in step S9 if the transmission is complete, returns to step S1 if the answer is NO but goes to the end of the process at step S10 if the answer at step S9 is YES. If the test at step S3 determines that an error has occurred, the receiving station switches at step S4 to the low transmission mode. Then, station RX starts the timer 12 in step S5 to count clock pulses, and at step S6 checks whether a recovery has taken place. If the answer is YES, the process returns to step S1 but if the answer is NO, the process checks at step S7 whether the count of clock pulses by the timer 12 exceeds a waiting period "WP" which in this example is calculated based on the image data bit-rate. If the count has not exceeded WP, the process returns to step S6; if the count has exceeded WP, the process disconnects the receiving station from the telephone line in step S8 and ends at step S10. In this manner, the receiving station waits only for a time period that is related meaningfully to the image data bit rate and can be shorter than a fixed waiting period which needs to be designed to accommodate different image data bit rates. Thus, the receiving station need not wait for image data for a wastefully long time period. While a suitable dependence of the time WP on the image data bit rate can be calculated or estimated in different ways, one example is as follows:

$$WP=[PIX+RCP\times3]\times8/[BIT\ RATE]$$

where, for example: PIX=(bytes per frame)(frames), e.g., the bytes per frame can be 2+256+2 and the number of frames can be 256; RCP can be (4+2) bytes; and BIT RATE can be 24,000. In this example, WP=22.2 sec. If in the otherwise same example the bit rate is 33,800, WP=15.8 sec.

Figure 7:
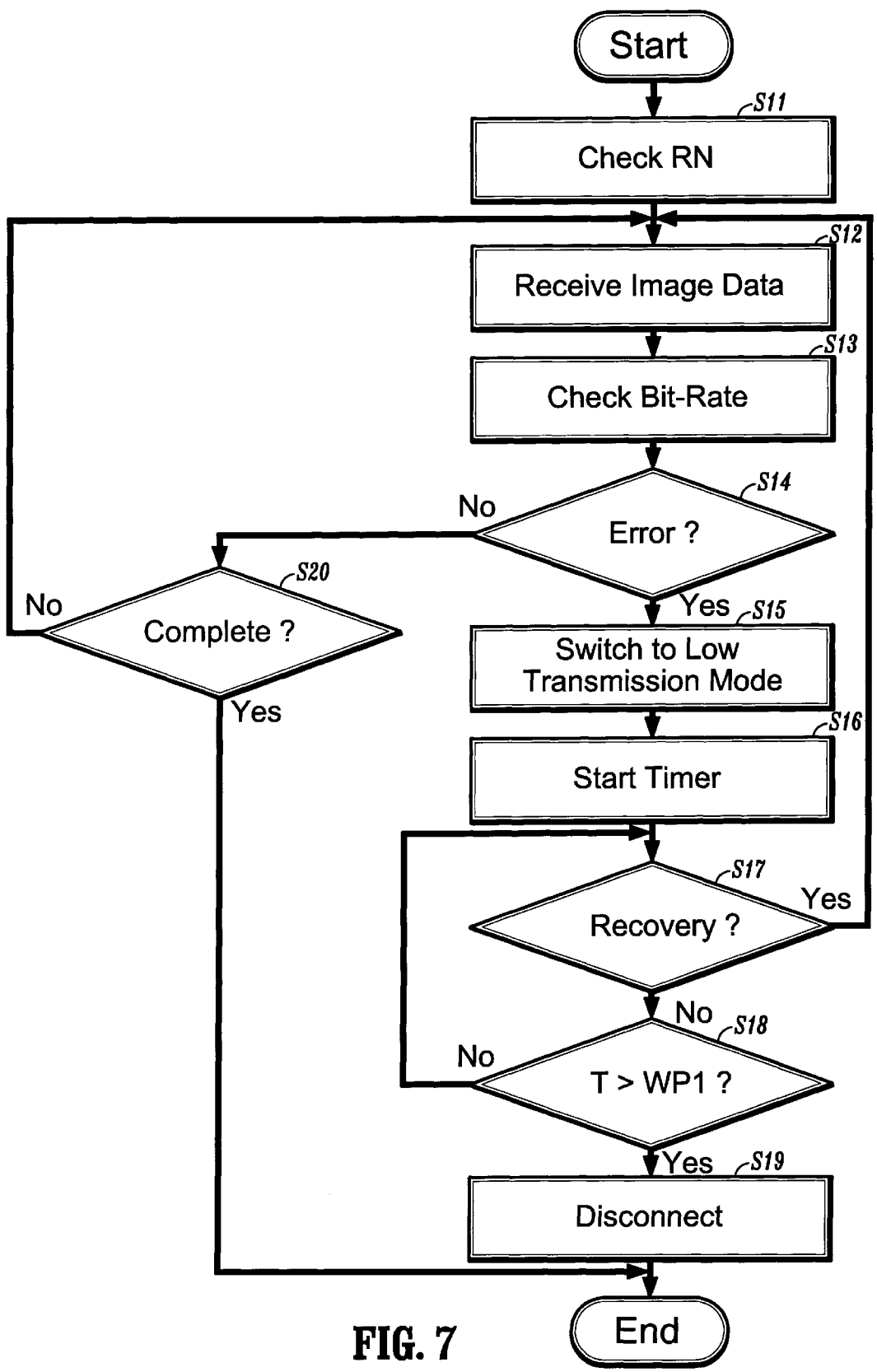
FIG. 7 is a flowchart illustrating a second embodiment.

FIG. 7 is a flowchart illustrating an example in which the waiting time is calculated based on how much of the expected image data was received before an error was detected so that the receiving station would wait for a time period WP1 related to the time the transmitting station would take to finish transmitting the expected image data and be able to detect the AC signal from the receiving station. Thus, at step S11 in FIG. 7 the receiving station checks and records the number RN (the number of requested data frames), then receives image data in step S12 and checks the bit rate in step S13, and tests for errors in step S14. If the process detects no transmission error in the test of step S14, it checks for completion in step S20 and if the answer is YES, ends the process but if the answer is NO, the process returns to step S12. If the test at step S14 determines that a transmission error has occurred, the receiving station switches to the low transmission mode at step S15 and starts sending the AC signal, and starts the timer 12 at step S16. The process checks at step S17 if a recovery has taken place and, if the answer is YES, returns to step S12. If the test at step S17 determines that no recovery has taken place, it checks at step S18 if the timer 12 has counted a time period T greater than a calculated waiting time WP1. If the answer at step S18 is NO, the process returns to step S17 but if the time T has exceeded the waiting period WP1, the process disconnects the receiving station from the telephone line at step S19 and ends. Again, while WP1 can be calculated or estimated in different ways, one example of doing so is to use the relationship:

$$WP1=[(bytes\ per\ frame)(PPR)+RCP\times3]\times8/BIT\ RATE$$

where PPR designates the number of frames received up until the detection of a transmission error, i.e., a number less than the number RN of requested frames, and the other components of the relationship have the meaning earlier described. In accordance with this example, the waiting time WP1 is related to how many frames were received before an error was detected, so that the receiving station would not wait needlessly after the transmitting station completes transmission of the current set of frames.

Figure 8:
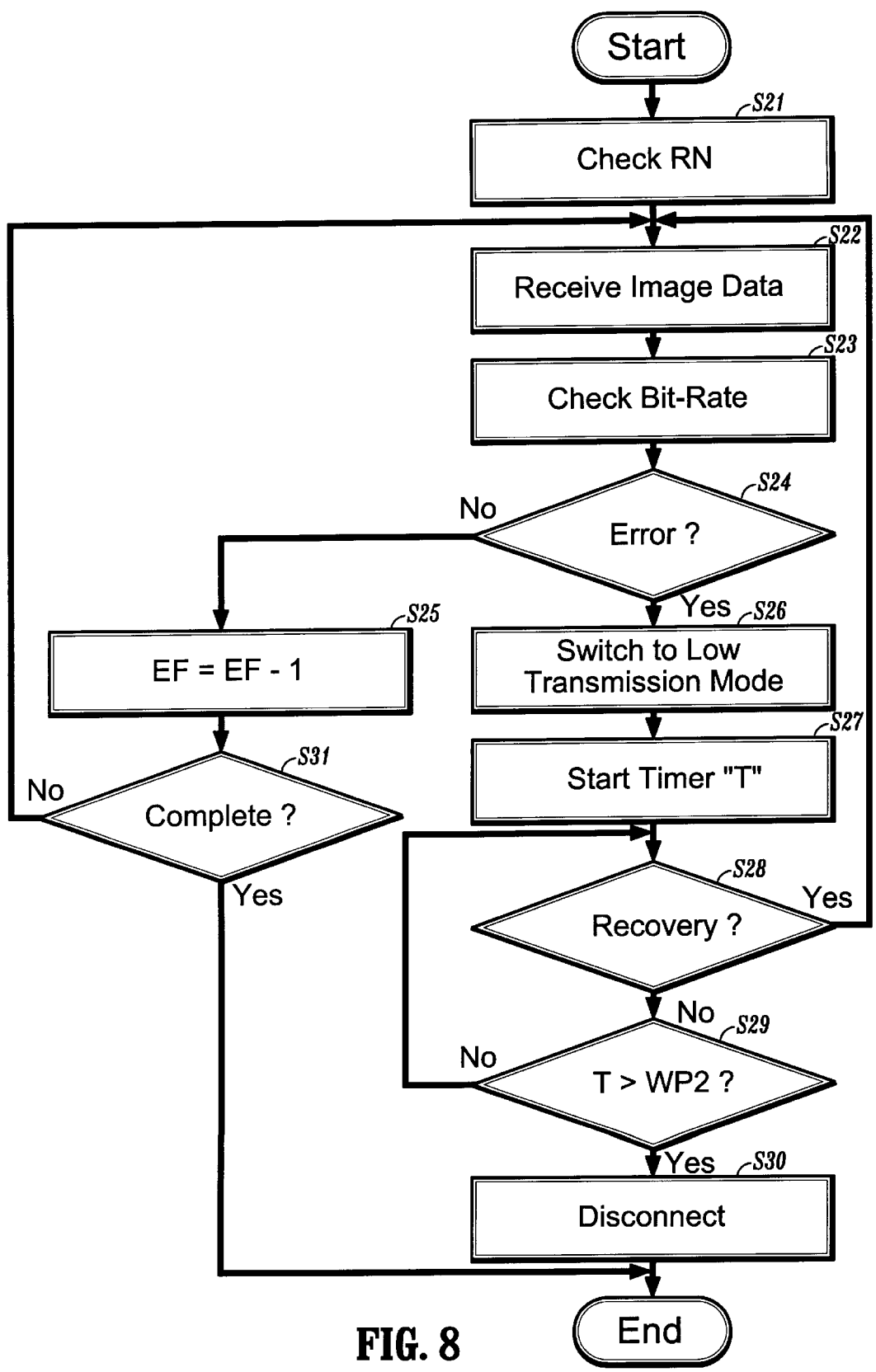
FIG. 8 is a flowchart illustrating a third embodiment.

Last, FIG. 8 illustrates an example in which the receiving station determines a waiting time WP2 depending on how many of the requested frames remained to be sent at the time the receiving station detected a transmission error. Thus, at step S21 in FIG. 8 the receiving station checks and records the number RN (the number of requested data frames), then receives a frame of image data in step S22 and checks the bit rate in step S23, and tests for errors in step S24. If the process detects no transmission error in the test of step S24, at step S25 it decrements by one the number EF of remaining frames of expected image data (where EF initially is set to RN), checks for completion in step S31 and if the answer is YES, ends the process but if the answer is NO, returns to step S22. If the test at step S24 determines that a transmission error has occurred, the receiving station switches to the low transmission mode at step S26 and starts sending the AC signal, and starts the timer 12 (or "T") at step S27. The process checks at step S28 if a recovery has taken place and, if the answer is YES, returns to step S22. If the test at step S28 determines that no recovery has taken place, it checks at step S29 if the timer 12 has counted a time period T greater than a calculated waiting time WP2. If the answer at step S29 is NO, the process returns to step S28 but if the time T has exceeded the waiting period WP2, the process disconnects the receiving station from the telephone line at step S30 and ends. Again, while WP2 can be calculated or estimated in different ways, one example of doing so is to use the relationship:

$$WP2=[(bytes\ per\ frame)(EF)+RCP\times 3]\times 8/BIT\ RATE$$

where EF designates the number of frames that remained to be received at the time a transmission error was detected, i.e., the number RN of requested frames minus the number of received frames at the time an error was detected, and the other components of the relationship have the meaning earlier described. In accordance with this example, the waiting time WP2 is related to how many frames remained to be received when an error was detected, so that the receiving station would not wait needlessly after the transmitting station completes transmission of the current set of frames.

This application claims priority to Japanese Application No. 9-077211 filed Mar. 28, 1997 which is incorporated herein in its entirety by reference.

While the above provides a full and complete disclosure of preferred embodiments of the present invention, various modifications, alternate constructions and equivalents may be employed without departing from the true spirit and scope of the invention. Therefore, the above description and illustration should not be construed as limiting the scope of the invention, which is defined by the appended claims.

What is claimed is:

1. A data communication apparatus having a low transmission mode and a high transmission mode, comprising:
   a switch selector switching the transmission mode between the high transmission mode and the low transmission mode based on a received switching signal;
   a mode detector detecting whether the switch selector has switched the transmission mode to the low transmission mode;
   a timer which starts to clock a time period after the switch selector has switched the transmission mode from the high transmission mode to the low transmission mode;
   a rate detector which detects a data bit-rate in the high transmission mode;
   a calculator which calculates a waiting period based on the detected bit-rate; and
   a disconnect unit which disconnects a telephone line if the clocked time period exceeds the waiting period calculated by said calculator, such that the telephone line is disconnected after a time period related to the detected data bit rate.

2. A data communication apparatus having a low transmission mode and a high transmission mode in which frames of image data are transmitted, comprising:
   a switch selector which switches the transmission mode based on a received switching signal;
   a mode detector which detects whether the switch selector has switched the transmission mode from the high transmission mode to the low transmission mode;
   a timer which starts to clock a time period after the switch selector has switched the transmission mode from the high transmission mode to the low transmission mode;
   a frame detector which detects the number of frames of image data transmitted before the switch selector switches to the low transmission mode;
   a calculator which calculates a waiting period based on the detected number of frames; and
   a disconnect unit which disconnects a telephone line if the clocked period exceeds the waiting period calculated by said calculator.

3. A data communication apparatus having a low transmission mode and a high transmission mode in which frames of image data are transmitted, comprising:
   a switch selector which switches the transmission mode based on a received switching signal:
   a mode detector which detects whether the switch selector has switched from the high transmission mode to the low transmission mode;
   a timer which starts to clock a time period after the switch selector has switched the transmission mode to the low transmission mode;
   a frame detector which detects a number of frames of image data expected to be transmitted at the time the switch selector switched the transmission mode to the low transmission mode;
   a calculator which calculates a waiting period based on the detected number of frames expected to be transmitted; and
   a disconnect unit which disconnects a telephone line if the clocked period exceeds the waiting period calculated by said calculator.

4. A method of controlling facsimile transmission between a transmitting station and a receiving station transmitting selectively in a high transmission mode and in a low transmission mode, comprising the steps of:
   transmitting data between the transmitting and the receiving station in a high transmission mode;
   detecting if a transmission error has occurred in the transmission of data in the high transmission mode and, upon the detection of an error, starting and maintaining a time count;
   computing a waiting time related to a parameter of the transmission of data in the high transmission mode;
   comparing the time count with the computed waiting time and attempting to have image data resent if the time count does not exceed the computed waiting period but discontinuing a connection between the transmitting and receiving stations otherwise, such that the connection is discontinued after a time period related to the parameter of the transmission of data in the high transmission mode.

5. A method as in claim 4 in which the computing step comprises computing a waiting time related to a bit rate of transmission of data in the high transmission mode.

6. A method as in claim 4 in which the computing step comprises computing a waiting time related to a number of frames of data received at the receiving station in the high transmission mode before the detection of an error.

7. A method as in claim 4 in which the computing step comprises computing a waiting time related to a number of frames of data expected to be received at the receiving station in the high transmission mode at the time of the detection of an error.

8. Facsimile apparatus selectively receiving data in a high transmission rate mode or a low transmission rate mode, comprising:

a receiving unit receiving data from a transmitting station over a communication link in a high transmission rate mode;

a detecting unit coupled to the receiving unit to detect when a transmission error has occurred in the data being received by the receiving unit;

a timer coupled to the detecting unit to commence a time count in response to the detection of a transmission error by the detecting unit;

a computing unit computing a waiting time related to a parameter of the data received by the receiving unit in the high transmission rate mode;

a control unit responding to the detection of a transmission error by the detecting unit to attempt to cause data to be re-sent from the transmitting station in the high transmission rate mode and coupled to the timer and to the computing unit to compare the time count and the waiting time and to disconnect the facsimile apparatus from the communication link if the data is not re-sent in the high transmission rate mode before a selected comparison result between the time count and the waiting time computed by the computing unit, such that the facsimile apparatus is disconnected from the communication link after a time period related to the parameter of the data received by the receiving unit in the high transmission rate mode.

9. Facsimile apparatus as in claim 8 in which the computing unit comprises a unit computing the waiting time as a function of a bit rate of facsimile data received in the high transmission rate mode.

10. Facsimile apparatus as in claim 8 in which the computing unit comprises a unit computing the waiting time as a function of a number of frames of data received until the occurrence of a transmission error detected by the detecting unit.

11. Facsimile apparatus as in claim 8 in which the computing unit comprises a unit computing the waiting time as a function of a number of frames of data expected to be received had there been no transmission error detected by the detecting unit.

12. A data communication apparatus having a low-speed transmission mode and a high-speed transmission mode for the transmission and reception of data, said apparatus comprising:

a switch selector for selectively switching the apparatus from the high-speed transmission mode to the low-speed transmission mode;

a mode detector for detecting when the apparatus has switched to the low-speed transmission mode;

a timer which indicates an amount of time after the mode detector has detected that the apparatus has switched to the low-speed transmission mode; and a disconnect unit which disconnects the apparatus from a communication link if the amount of time exceeds a waiting period which varies based on a communication variable.

13. An apparatus as recited in claim 12, further comprising:

a rate detector which detects the communication variable; and a calculator which calculates the waiting period based on the detected communication variable, such that the communication link is disconnected after a time period related to the detected communication variable.

14. An apparatus as recited in claim 13, wherein the communication variable comprises a data bit rate.

15. An apparatus as recited in claim 13, wherein the communication variable comprises a data bit rate detected by the rate detector in the high-speed transmission mode.

16. A method of controlling a data communication apparatus having a low transmission mode and a high transmission mode, comprising steps of:

switching the transmission mode between the high transmission mode and the low transmission mode based on a received switching signal;

detecting whether the switch selector has switched the transmission mode to the low transmission mode;

starting to clock a time period after the switch selector has switched the transmission mode from the high transmission mode to the low transmission mode;

detecting a data bit-rate in the high transmission mode;

calculating a waiting period based on the detected bit-rate; and disconnecting a telephone line if the clocked time period exceeds the calculated waiting period, such that the telephone line is disconnected after a time period related to the detected data bit rate.

17. A method of controlling a data communication apparatus having a low transmission mode and a high transmission mode in which frames of image data are transmitted, said method comprising:

switching the transmission mode based on a received switching signal;

detecting whether the switch selector has switched the transmission mode from the high transmission mode to the low transmission mode;

starting to clock a time period after the switch selector has switched the transmission mode from the high transmission mode to the low transmission mode;

detecting the number of frames of image data transmitted before the switch selector switches to the low transmission mode;

calculating a waiting period based on the detected number of frames; and disconnecting a telephone line if the clocked period exceeds the waiting period calculated by said calculator.

18. A method of controlling a data communication apparatus having a low transmission mode and a high transmission mode in which frames of image data are transmitted, said method comprising:

switching the transmission mode based on a received switching signal;

detecting whether the switch selector has switched from the high transmission mode to the low transmission mode;

starting to clock a time period after the switch selector has switched the transmission mode to the low transmission mode;

detecting a number of frames of image data expected to be transmitted at the time the transmission mode is switched to the low transmission mode;

calculating a waiting period based on the detected number of frames expected to be transmitted; and disconnecting a telephone line if the clocked period exceeds the calculated waiting period.

19. A facsimile apparatus for transmitting between a transmitting station and a receiving station selectively in a high transmission mode and in a low transmission mode, said apparatus comprising:

a transmitter for transmitting data between the transmitting and the receiving station in a high transmission mode;

a detector for detecting if a transmission error has occurred in the transmission of data in the high transmission mode and, upon the detection of an error, starting and maintaining a time count;

a calculator for computing a waiting time related to a parameter of the transmission of data in the high transmission mode; and a comparator for comparing the time count with the computed waiting time and attempting to have image data resent if the time count does not exceed the computed waiting period but discontinuing a connection between the transmitting and receiving stations otherwise, such that the connection is discontinued after a time period related to the parameter of the transmission of data in the high transmission mode.

20. A method of controlling a Facsimile apparatus for selectively receiving data in a high transmission rate mode or a low transmission rate mode, said method comprising:

receiving data from a transmitting station over a communication link in a high transmission rate mode;

detecting when a transmission error has occurred in the data being received by the receiving unit;

commencing a time count in response to the detection of a transmission error;

computing a waiting time related to a parameter of the data received by the receiving unit in the high transmission rate mode; and responding to the detection of a transmission error by the detecting unit to attempt to cause data to be re-sent from the transmitting station in the high transmission rate mode and comparing the time count and the waiting time and disconnecting the facsimile apparatus from the communication link if the data is not re-sent in the high transmission rate mode before a selected comparison result between the time count and the waiting time, such that the facsimile apparatus is disconnected from the communication link after a time period related to the parameter of the data received by the receiving unit in the high transmission rate mode.

21. A method of controlling a data communication apparatus having a low-speed transmission mode and a high-speed transmission mode for the transmission and reception of data, said method comprising steps of:

selectively switching the apparatus from the high-speed transmission mode to the low-speed transmission mode;

detecting when the apparatus has switched to the low-speed transmission mode;

determining an amount of time after the mode detector has detected that the apparatus has switched to the low-speed transmission mode; and disconnecting the apparatus from a communication link if the amount of time exceeds a waiting period which varies based on a communication variable.

22. A method as recited in claim 21, further comprising steps of:

detecting the communication variable; and calculating the waiting period based on the detected communication variable, such that the communication link is disconnected after a time period related to the detected communication variable.

23. A method as recited in claim 22, wherein the communication variable comprises a data bit rate.

24. A method as recited in claim 22, wherein the communication variable comprises a data bit rate detected in the high-speed transmission mode.

* * * * *